May 10, 1955 T. F. SARAH 2,708,079
AUTOMATIC FLY REEL CONSTRUCTION
Filed Jan. 27, 1953 2 Sheets-Sheet 1

INVENTOR.
THOMAS F. SARAH
BY *Ely, Frye & Hamilton*
ATTYS.

May 10, 1955     T. F. SARAH     2,708,079
AUTOMATIC FLY REEL CONSTRUCTION
Filed Jan. 27, 1953     2 Sheets-Sheet 2
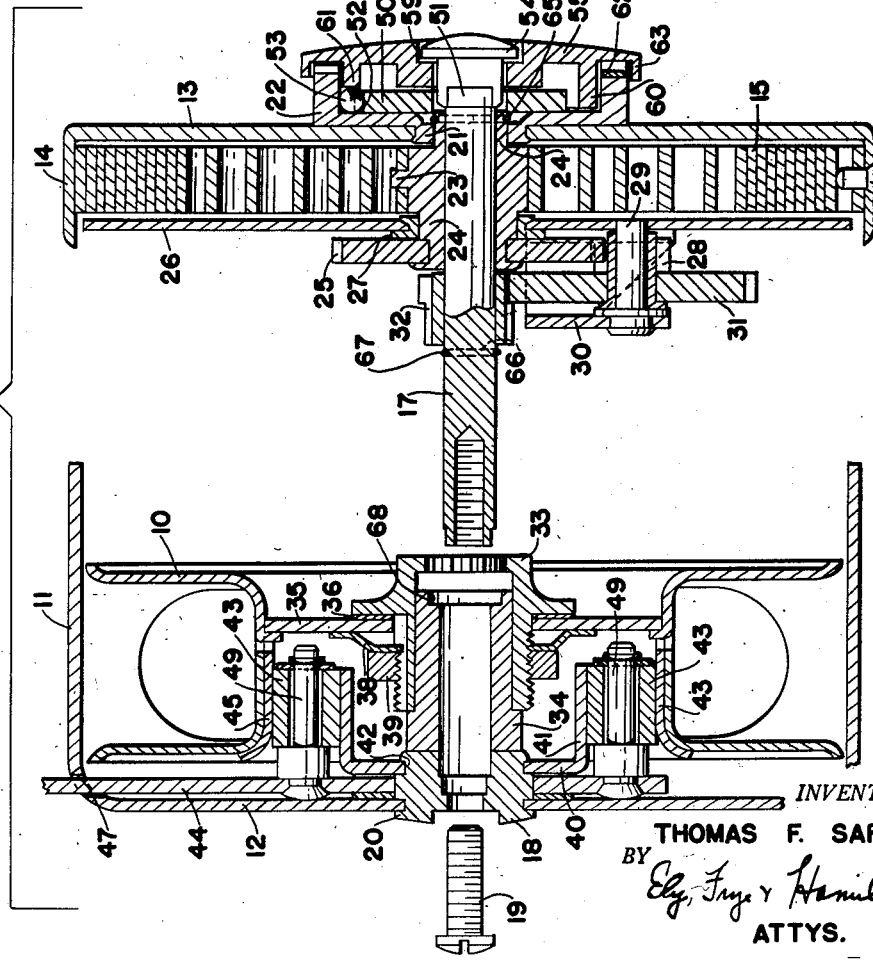
INVENTOR.
THOMAS F. SARAH
BY
ATTYS.

United States Patent Office 2,708,079
Patented May 10, 1955

2,708,079

AUTOMATIC FLY REEL CONSTRUCTION

Thomas F. Sarah, Akron, Ohio, assignor to The Enterprise Manufacturing Company, Akron, Ohio, a corporation of Ohio Application January 27, 1953, Serial No. 333,521

7 Claims. (Cl. 242—84.4)

The invention relates to automatic, spring-driven fishing reels, and specifically to improvements in construction which facilitate assembly and disassembly of the reel parts.

In using automatic fly reels, it is desirable to change reel spools occasionally, and this requires disassembly of the reel housing and disconnecting the parts in the spool end from the parts in the spring end. With prior constructions this operation has not only been complicated and time-consuming, but involves the danger of unhooking the end of the power spring from its anchor, which causes the spring end to fly apart if there is even a small amount of tension on the spring.

Moreover, where a ratchet device for holding the spring is removably mounted on the outer end of the reel shaft adjacent the spring housing, as in my copending application, Serial No. 297,497, filed July 7, 1952, now Patent No. 2,672,217, removal of the ratchet device usually leads to difficulty in keeping the spring assembly together and in reassembly of the ratchet device.

It is an object of the present invention to provide an improved fly reel construction in which the spool assembly can easily be separated from the spring assembly without danger of unhooking the spring or disassembling the parts connected thereto.

Another object is to provide an improved fly reel construction in which the spool assembly can be removed and the spool changed merely by removing a single screw.

A further object is to provide an improved fly reel assembly having a ratchet device on the outer end of the reel shaft adjacent the spring housing, and means normally securing the spring and spring housing together while permitting disassembly of the ratchet device and removal of the shaft.

Finally, it is an object of the present invention to provide a compact, inexpensive and efficient construction which accomplishes all of the foregoing desiderata.

These and other objects are accomplished by the improvements and constructions comprising the present invention, a preferred embodiment of which is shown and described herein by way of example. It is to be understood that various changes and modifications in details of construction may be made within the scope of the invention as defined in the appended claims.

In the drawings:

Fig. 2 is a similar exploded view showing the spool assembly separated from the spring assembly; and Fig. 3 is a similar view of the spring assembly showing the ratchet device and reel shaft partly removed.

Figure 1:
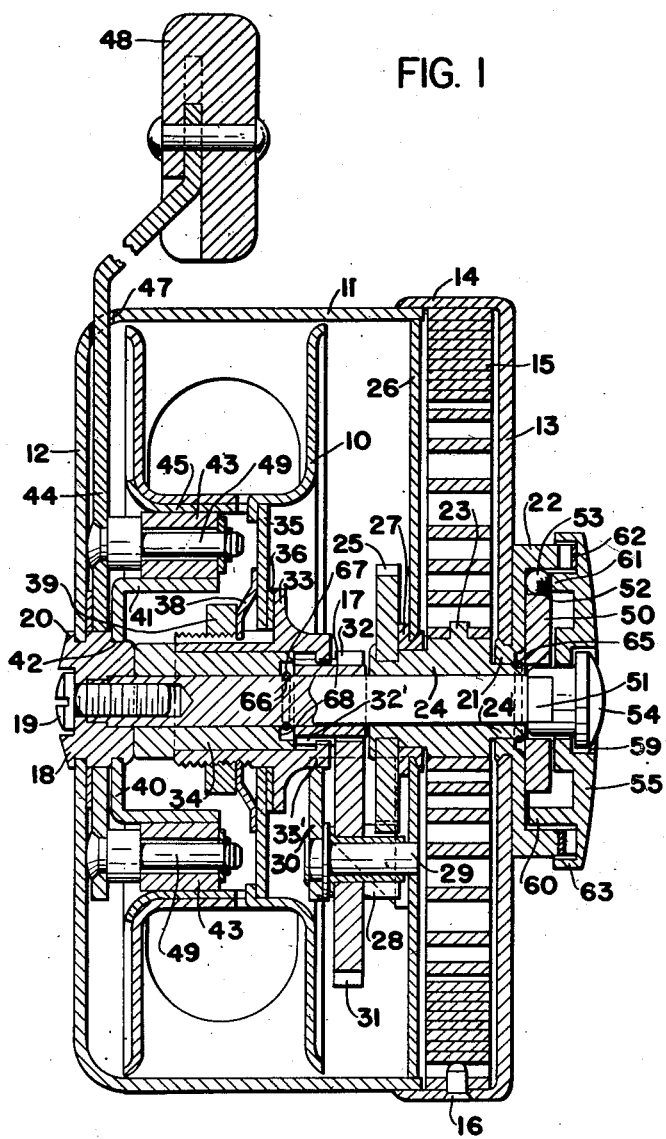
Fig. 1 is a cross sectional view of an automatic fly reel embodying the improvements of the present invention.

The reel shown in the drawings is generally similar in construction to that shown in Patent No. 2,672,217, but embodies certain changes in detail thereover which effect the particular objects of the present invention while preserving all the advantages of the former construction.

In the drawings the reel spool 10 is shown mounted within a casing 11 having a wall 12 closing one end. A cup-shaped spring casing or winding drum is rotatably mounted on the other end of casing 11 and includes an end wall 13 and a peripheral flange 14 which overlaps the edge of the casing 11. The flange 14 is secured to the outer end of a spiral power spring 15 by a screw or rivet 16, and the outer surface of the flange 14 may be knurled to facilitate turning it to wind the spring.

The shaft 17 on which the reel spool is journaled is non-rotatively secured at one end in a bushing 18 by means of a screw 19 threaded into the end of the shaft, the bushing being preferably swaged over the edge of an opening in the end wall 12 of the housing, as indicated at 20, in a usual manner. The other end of the shaft 17 is mounted in bushing 24 having a portion 24' which extends axially through a bushing 21 swaged into an opening in the end wall 13 of the spring case, and the bushing 21 has an external, cup-shaped portion including an annular flange 22 forming part of the ratchet device for the power spring, as will later be described.

The inner end of the power spring 15 slips over a stud 23 on the bushing 24 journaled on shaft 17, for driving the bushing, and a gear 25 is swaged or otherwise fixed on the inner end of the bushing. As shown, a partition wall 26 may be provided in the casing 11 adjacent the spring 15, and the partition wall is carried on a collar 27 journaled on the bushing 24 between the spring and the gear 25. The gear 25 meshes with a pinion 28 journaled on a stub shaft 29 mounted at one end in the partition wall 26 and at the other end in a bracket 30 carried on said wall. The pinion 28 has a gear 31 splined on one end and meshing with a pinion 32 journaled on the shaft 17.

One end of pinion 32 has a splined connection with a friction clutch member 33 journaled on a bushing 34 and frictionally contacting one side of the web 35 of the reel spool 10 by means of a friction washer 36. The splined connection preferably comprises a gear portion 32' on the pinion meshing with a gear portion 33' on clutch member 33. The other side of the web is contacted by a dished resilient disk member 38. The amount of frictional resistance between the friction surfaces may be adjusted by a thrust nut 39 abutting disk 38, so as to allow slippage of the reel under an extreme pull on the line before the line breaks. Thus the power spring 15 drives the reel spool to wind the line thereon through gears 25, 28, 31, 32 and friction members 33, 36 and 37.

A roller brake is provided for stopping rotation of the spool in the direction to wind the line and permitting free rotation in the opposite direction to unwind the line. The brake includes a cam member 40 having curved cam flanges 41 spaced radially inward of the spool rim, the central part of the cam member having a flat sided opening secured on a flatted portion 42 of the bushing 18. A pair of diametrically opposite rollers 43 are mounted on a brake lever 44 journaled on bushing 18, said rollers being located between the cam flanges 41 and the inner rim member 45 of the spool. The lever 44 is normally urged by a suitable spring in a direction toward the wedging or locking position of the rollers between the cams and spool flange.

The outer end of the lever 44 extends through a slot 47 in the casing and is preferably provided with a finger pad 48 to rotate the lever against the pressure of its spring and free the rollers 43 from locking engagement between the cams 41 and rim 45, the loose journals of the rollers on their shafts 49 permitting disengagement of the rollers from the rim and free winding of the spool by the power spring 15.

With the exception of the extended portion 24' of bushing 24, the construction and arrangement of the parts thus far described is generally similar to that disclosed in said Patent No. 2,672,217, and of themselves they form no part of the present invention.

When the spring 15 is wound by turning the drum flange 14, the cup-shaped flange member 22 turns with the casing. Within the member 22 is a cam disk 50 secured on a flatted portion 51 under the flanged head 54 of shaft 17 and having a series of cam notches 52 in its outer periphery. Balls 53 are located in the cam notches and roll on the inner cylindrical surface of the flange 22. The notches 52 are so shaped that when the flange 22 rotates in one direction the balls allow free rotation of the flange 22 and hence winding of the spring, but when the flange turns a very slight amount in the opposite direction tending to unwind the spring, the balls immediately wedge between the cam notches 52 and the flange 22.

The means for controlling the balls 53, to release the spring tension at any time, preferably includes a cap 55 secured on the outer end of the flatted portion 51 of shaft 17 by the flanged head 54 which is fixed on the end of the shaft. The head 54 of the shaft fits into a recess 59 in the cap and the central portion of the cap abuts the face of the cam disk 50. An annular flange 60 concentric with outer flange 22 is provided on the underside of the cap registering with the annular space between the cam disk 50 and the outer flange 22, and the flange 60 has pockets or slots 61 fitting over the balls. Hence manual rotation of the cap 55 at any time will free the balls from locking engagement with flange 22 and allow unwinding of the spring. Around the outer edge of the flange 60 an annular spring strip 62 of wavy contour is positioned in a groove formed by a rim flange 63 for engaging the flange 22 of the ratchet to yieldingly restrain turning of the cap 55. Preferably, the flange 60 is slightly peened over the balls 53 at the edges of the slots 61 to retain the balls in place if the cap is removed.

The construction and operation of the ratchet device described herein is generally similar to that disclosed in said Patent No. 2,672,217.

In the operation of the improved reel, as the power spring is wound, the ratchet device in flange member 22 locks the spring after each turn, and rotation of the spool 10 is prevented by the brake rollers 43 held in locking engagement between the spool and the cams 41 by the lever 44 in its normal position. After the power spring has been sufficiently wound it will wind the line on the spool when the lever is held in released position, and the line may be stripped by hand from the reel because an unwinding pull on the line will roll the rollers 43 away from the high points of the cams 41 to free the spool momentarily each time the line is stripped. The reel is used in casting in an obvious and well known manner.

By providing the flanged head 54 on the end of shaft 17 for holding the parts of the ratchet device in position, the parts are not detached when the reel is disassembled by removing the single screw 19 in the manner shown in Figs. 2 and 3, but the ratchet device can be disassembled by withdrawing the shaft from the bushing 24 to the right as shown in Fig. 3. The outer end 24' of the bushing, which extends through bushing 21, has a split retainer ring 65 detachably secured in a groove in the bushing extension outside of the bushing 22, for locking the spring housing 13 and bushing 24 together and preventing any chance of the spring flying apart, the other end of the bushing 24 being prevented from endwise movement by partition wall 26. This construction makes the assembly of the spring and its related parts a simple operation during manufacture, and for the purpose of replacing a broken spring at the factory the spring is easily accessible by removing retainer ring 65.

In order to retain the entire spring assembly intact when it is desired to change the spool at the other end of the shaft, the shaft 17 is provided adjacent the inner end of pinion 32 with a groove 66 for receiving a split retainer ring 67, the end of bushing 34 being recessed at 68 to receive this ring. The ring 67 holds the pinion 32 in position adjacent the end of bushing 24, so that when screw 19 is removed the brake and spool assembly can be pulled off the shaft without disturbing the spring assembly in any way, as shown in Fig. 2. The spool assembly can then be separated from the roller brake and the spool changed, following which the spool assembly and brake are easily replaced on the shaft in proper position.

Thus by removing one screw 19 the spool can be removed and replaced without disturbing the spring assembly, and by removing one retainer ring 67, the ratchet device may be taken apart without danger of unhooking the spring.

What is claimed is:

1. In an automatic spring wind reel having a shaft, a spool and brake assembly on the shaft and having a driven gear journaled on said shaft, and a power spring assembly on the shaft having a driving pinion on the shaft meshing with said gear, a single screw threaded into the end of said shaft and holding said spool and brake assembly in operative relation to said spring assembly, and a retainer ring detachably engaged on the shaft behind the pinion and holding said power spring assembly together when the spool and brake assembly is removed.

2. In an automatic spring wind reel having a shaft, a spool and brake assembly on the shaft and having a driven gear journaled on said shaft, and a power spring assembly on the shaft having a driving pinion on the shaft meshing with said gear, a head secured on one end of the shaft retaining the spring assembly against movement on the shaft in one direction, a retainer ring detachably engaged on the shaft behind the pinion retaining the spring assembly against movement on the shaft in the opposite direction, and a screw threaded into the other end of the shaft retaining the spool and brake assembly in operative relation to said spring assembly.

3. In an automatic spring wind reel having a shaft, a spool assembly on the shaft and having a driven gear journaled on said shaft, a power spring assembly on the shaft having a driving pinion on the shaft meshing with said gear, and a spring ratchet device on the shaft at the outer side of the spring assembly, a head on the shaft holding the rachet device and spring assembly against axial movement in one direction, a retainer ring detachably engaged on the shaft at the inner side of said pinion holding said spring assembly against movement in the opposite direction, and a screw threaded into the other end of the shaft retaining the spool assembly in operative relation to the spring assembly.

4. In an automatic spring wind reel having a shaft, a spool on the shaft and a power spring operatively connected to said spool, a spring housing carried on the shaft and surrounding said spring, a bushing on the shaft anchoring the inner end of the spring and extending axially beyond the outer side of the housing, a retainer ring detachably engaged on the bushing extension to retain the housing thereon, a head on the shaft outwardly of said housing retaining the spring and housing assembly against axial movement in one direction, and a retainer ring detachably engaged on the shaft inwardly of the spring and housing assembly to hold it against axial movement in the opposite direction.

5. In an automatic spring wind reel having a shaft, a spool on the shaft and a power spring operatively connected to said spool, a spring housing carried on the shaft and surrounding said spring, a bushing on the shaft anchoring the inner end of the spring and extending axially beyond the outer side of the housing, a retainer ring detachably engaged on the bushing extension to retain the housing thereon, a head on the shaft outwardly of said housing retaining the spring and housing assembly against axial movement in one direction, a retainer ring detachably engaged on the shaft inwardly of the spring and housing assembly to hold it against axial movement in the opposite direction, and a single screw threaded into the end of the shaft opposite to said head and holding the spool in operative relation to said spring.

6. In an automatic spring wind reel having a shaft, a spool on the shaft and a power spring operatively connected to said spool, a spring housing carried on the shaft and surrounding said spring, a bushing on the shaft anchoring the inner end of the spring and extending axially beyond the outer side of the housing, a flanged ratchet casing mounted on said bushing extension and supporting said housing, a retainer ring detachably engaged on said bushing extension to retain said ratchet casing on said bushing, a ratchet device for the spring in said casing, a head on the end of the shaft axially retaining the ratchet device, and a retainer ring detachably engaged on the shaft inwardly of the spring and housing assembly to hold it against axial movement inwardly of the head.

7. In an automatic spring wind reel having a shaft, a spool on the shaft and a power spring operatively connected to said spool, a spring housing carried on the shaft and surrounding said spring, a bushing on the shaft anchoring the inner end of the spring and extending axially beyond the outer side of the housing, a flanged ratchet casing mounted on said bushing extension and supporting said housing, a retainer ring detachably engaged on said bushing extension to retain said ratchet casing on said bushing, a ratchet device for the spring in said casing, a head on the end of the shaft axially retaining the ratchet device, a retainer ring detachably engaged on the shaft inwardly of the spring and housing assembly to hold it against axial movement inwardly of the head, and a single screw threaded into the end of the shaft opposite to said head and holding the spool in operative relation to said spring.

References Cited in the file of this patent

UNITED STATES PATENTS

| Number | Name | Date |
|---|---|---|
| 2,145,474 | Burdick et al. | Jan. 31, 1939 |
| 2,331,767 | Clickner | Oct. 12, 1943 |
| 2,548,317 | MacBlane | Apr. 10, 1951 |
| 2,573,240 | Berlinger | Oct. 30, 1951 |